United States Patent Office 3,048,051
Patented Aug. 7, 1962

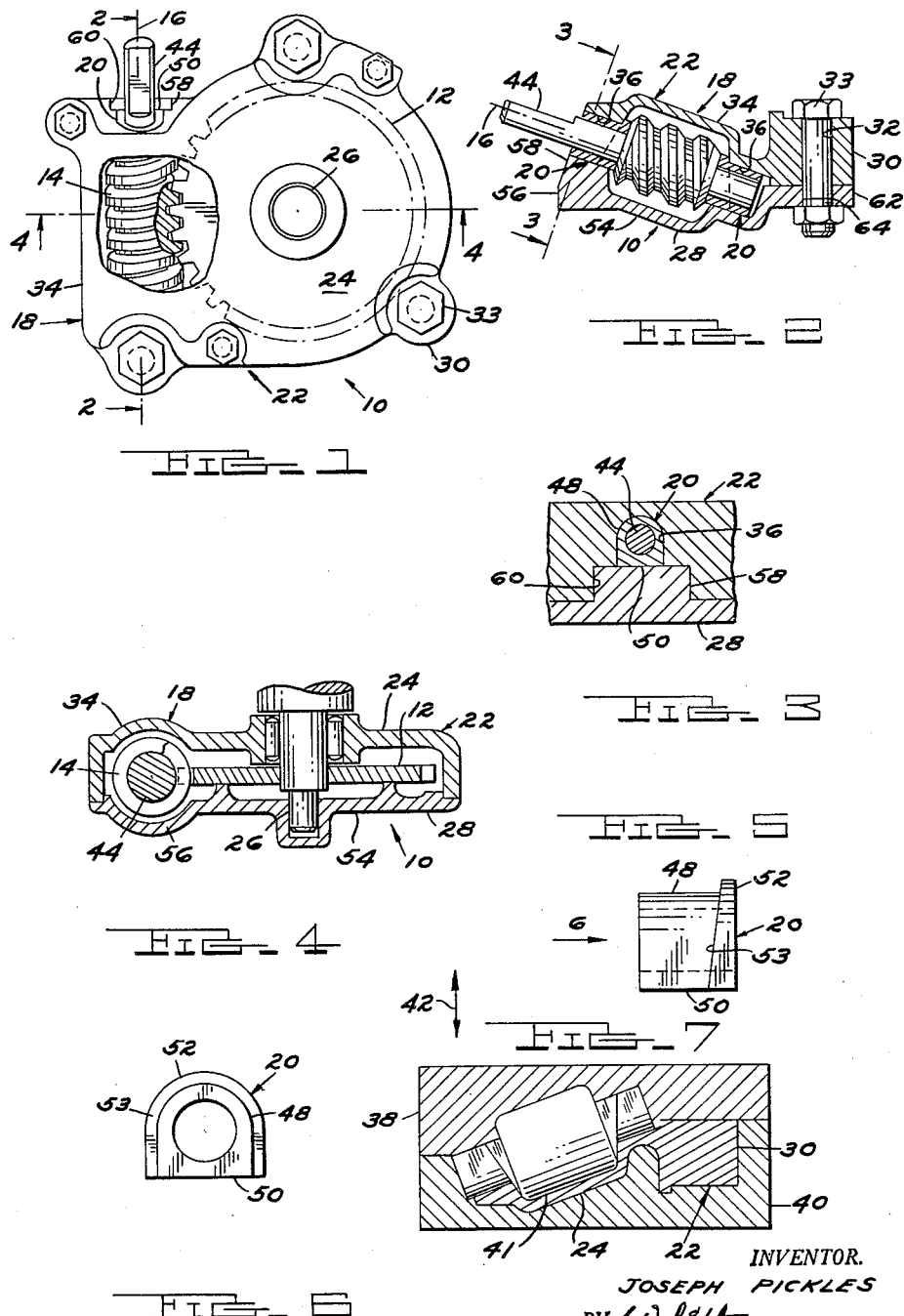

3,048,051
GEAR BOX
Joseph Pickles, Dearborn, Mich., assignor to Ferro Stamping Company, Detroit, Mich., a corporation of Michigan
Filed Aug. 10, 1959, Ser. No. 832,606
1 Claim. (Cl. 74—425)

The present invention relates to gear boxes and refers more particularly to a gear box for housing gears which mesh at odd angles which gear box has no undercut surfaces and in which pre-assembled gears, gear shafts and bearings may be mounted.

When gears such as a worm gear and a gear driven thereby mesh at odd angles and it is desired to mount the gears in a gear box closely surrounding them and formed in two sections secured together it has in the past been necessary to form the halves of the gear box with complicated dies at substantial expense due to undercutting surfaces on the sections which would prevent the removal of the sections from simple forming dies capable of separating movement only in one direction.

It is therefore one of the purposes of the present invention to provide a gear box for gears which mesh at odd angles the halves of which may be formed in forming dies that may be removed from the gear box sections by movement thereof in a single direction.

It is another purpose to provide a gear box for mounting gears which is formed in two halves, one half of which is adapted to receive a pre-assembled gear and bearing assembly in slots therein, said gear and bearing assembly being held in position within said slots by the other half of said gear box.

More specifically it is a purpose to provide a gear box for gears which mesh at odd angles which is formed of two halves, neither of which have surfaces formed by undercutting other surfaces on the same side thereof whereby said halves of said gear box may be produced by forming dies capable of movement in only a single direction.

Still more specifically it is a purpose to provide a gear box in which gears may be mounted which is formed in two halves, one half of which includes a pair of slots in opposite surfaces thereof adapted to receive bearings having the opposite ends of a shaft journaled therein on which is mounted a gear to be housed by said gear box, the other half of said gear box being adapted to be secured to said first half to maintain said bearings in position within said slots in said first half, neither of said gear box halves having surfaces formed by undercutting other surfaces on the same side thereof whereby said halves of said gear box may be produced by forming dies capable of movement in only a single direction, said bushings being formed to provide bearing surfaces in contact with selected surfaces of said one half of said gear box and to mount said rod and gear at a predetermined angle within said gear box.

Other objects and features of the invention will become apparent as the description proceeds, especially when taken in conjunction with the accompanying drawings, illustrating a preferred embodiment of the invention, wherein:

FIGURE 1 is a plan view partly broken away of a gear box constructed according to the invention.

FIGURE 2 is a partial section of the gear box shown in FIGURE 1 taken on the line 2—2 in FIGURE 1.

FIGURE 3 is a partial elevation of the gear box shown in FIGURES 1 and 2 taken in the direction of arrow 3 in FIGURE 2.

FIGURE 4 is a partial section of the gear box illustrated in FIGURE 1 taken on the line 4—4 in FIGURE 1.

FIGURE 5 is a side elevation of a bearing especially adapted for use with the gear box illustrated in FIGURE 1.

FIGURE 6 is an end view of the bearing shown in FIGURE 5 taken in the direction of arrow 6 in FIGURE 5.

FIGURE 7 is a partial section of the base portion of the gear box of FIGURE 1 showing the relation thereof to the dies used in the forming of the base portion.

One embodiment of a gear box according to the invention will now be described with particular relation to the figures.

In FIGURE 1 there is shown a gear box generally indicated 10 constructed according to the invention in which a gear 12 is mounted in mesh with a worm gear 14, the axis of rotation 16 of which is set at an angle to the plane of the gear 12. With the worm gear thus positioned at an angle to the plane of the gear 12 it is necessary to provide the gear box 10 with a portion generally indicated 18 and best shown in FIGURE 2 which also extends at a similar angle to the general plane of the rest of the gear box 10. In the interest of production efficiency it is desirable to construct the gear box 10 so that the parts thereof may be formed with the use of a die which is capable of travelling only in a single direction. According to the invention as will subsequently be disclosed the gear box 10 and especially the portion 18 thereof is particularly adapted to be constructed with the use of such a die. Also in accordance with the invention the construction of the gear box 10 in the desired manner requires the use of special bearing members 20 which may be quickly and easily mounted within the gear box 10 in assembly with worm gear 14 on a rod 44 as will be considered later.

The base 22 of the gear box 10 is shaped as shown best in FIGURES 2 and 7. The base 22 includes a substantially dish-shaped portion 24 in which gear 12 is mounted by convenient means such as an axle pin 26 journaled for rotation at one end in the base 22 of the gear box 10 and at the other end in the cap 28 thereof. The base 22 is also provided with bosses 30 spaced therearound as shown best in FIGURE 1 which have openings 32 therethrough to receive bolts 33 which may be used to secure the base 22 and cap 28 together in the assembled gear box 10.

The base 22 also includes a portion 34 in the general shape of a half cylinder set at an angle to the plane of the gear 12 and dish-shaped portion 24 of the gear box 10. The portion 34 of base 22 forms part of the previously discussed portion 18 of the gear box 10. Recesses or openings 36 in the form shown best in FIGURE 3 are provided at opposite ends of the portion 34 of base 22 into which special bearings 20 are received in the assembled gear box as will later be described in detail.

It will be noted that the base 22 formed as shown is capable of being produced with the use of dies or molds such as 38 and 40, shown in FIGURE 7 in conjunction with core 41, which are capable of linear movement only as indicated by the arrow 42. This is possible due to the maintaining of proper draft angles on the base 22 and eliminating all surfaces thereon which tend to undercut other surfaces on the same side of the base 22. The eliminating of the surfaces which tend to undercut other surfaces on the same side of the base 22 of the gear box 10 necessitates the provision of the special bearings 20 for the mounting of shaft 44 on which the worm gear 14 is keyed or otherwise fixed so that the bearings may properly seat against the base 22 within the slots 36 with the shaft 44 aligned with axis 16 to assure the desired inner action between the worm gear 14 and the gear 12.

The special bearings 20 are best shown in FIGURES 5 and 6 and as illustrated, have cylindrical portions 48 adapted to fit snugly within the slots 36 in the portion 34 of the gear box 10. The bearings 20 are also provided with a flat surface 50 as illustrated which in assembly is engaged by the cap 28 to hold the bearings in the slots 36 and prevent rotation thereof with shaft 44. A flange 52 is provided at one end of the bearings 20 having an inner surface 53 which extends at an angle to the ends thereof such that bearing contact will be made between the surface 53 and the inner surface of the base 22 of the gear box 10 around the slots 36 in portion 34 thereof when the bearings are positioned to align the shaft 44 which is journaled therein with the axis 16.

The cap 28 as shown best in FIGURE 2 is formed with a dish-shaped portion 54 and a portion 56 in the form of a portion of a cylinder which register with the portion 24 and 34 of the base 22 in assembly of the gear box 10. Also it will be noted that the cap 28 is provided with a projecting portion 58 at one end thereof which is received in a mating recess 60 in the portion 34 of base 22 and which serves to secure one of the special bearings 20 in one of the slots 36 in the base member 22. The other bearing 20 is likewise secured in a slot 36 in the base 22 by the cap 28. As illustrated the cap 28 is also provided with bosses 62 having openings 64 therethrough which are in alignment with the openings 32 in the bosses 30 on the base member 22 and in conjunction with bolts 33 provide means for assembling the gear box 10. Cap 28 is also capable of being produced by dies such as 38 and 40 capable of movement in a single direction as illustrated in FIGURE 7 in conjunction with base 22.

In assembly a gear 12 journaled for rotation on an axle pin 26 is positioned within the dish-shaped portion of the base 22. A worm gear is keyed or otherwise secured to a shaft 44, special bearings 20 are sleeved over each end of the shaft 44 and are abutted against the worm gear 14. The assembled rod, worm gear and bearings are then positioned on the base 22 by means of inserting the bearings 20 in the slots 36 provided therefor. The cap 28 is subsequently placed over the assembled gears 12 and 14 and is secured to the base 22 by convenient means such as the bolts 33 previously mentioned to complete the assembly of the gear box 10.

Thus applicant has provided a gear box 10 for housing a worm gear and a gear driven thereby which are positioned at an angle to each other wherein the worm gear, the shaft on which it is mounted and the bearings in which the shaft is journaled for rotation may be pre-assembled and inserted into one portion of the gear box to be clamped in position by the other portion of the gear box.

Also as indicated above applicant has provided a gear box capable of housing a worm gear and a gear driven thereby which are angularly related, all of the parts of which may be produced with dies capable of movement in a single direction due to the elimination of undercut surfaces in the members of the gear box and the provision of special bearings for mounting the worm gear.

The drawings and the foregoing specification constitute a description of the improved gear box in such full, clear, concise and exact terms as to enable any person skilled in the art to practice the invention, the scope of which is indicated by the appended claim.

What I claim as my invention is:

A meshed worm and worm gear which gears have axes of generation extending at an oblique angle to each other, a gear box closely surrounding said worm and worm gear, said gear box including a base and a cap all portions of each of which have at least a minimum draft angle with respect to a predetermined transverse direction, said base and cap having dish-shaped portions receiving the worm gear for rotation therein and cylindrical portions extending at the same oblique angle to the plane of the dish-shaped portions as the axes of generation of the worm and worm gear make with each other, said cylindrical portions including end walls having non-circular openings therethrough, a bearing sleeve coaxial with the cylindrical portions of the gear box secured within each of the non-circular openings and having a similar non-circular exterior surface, each bearing sleeve including a radially extending flange within the interior of the cylindrical portion of the base and cap, the axially inner surface of each flange being tapered to engage in surface-to-surface contact with the inner surface of the end wall of the cylindrical portions of the base and cap and making the same angle with the axially outer surface of the radial flange as the axes of generation of the worm and worm gear make with each other, and a shaft rotatably mounted in the bearing sleeves, said worm gear being mounted on said shaft between the axially outer surfaces of the bearing sleeves within the cylindrical portion of the gear box in mesh with the worm gear.

References Cited in the file of this patent

UNITED STATES PATENTS

| | | |
|---|---|---|
| 512,071 | Towne | Jan. 2, 1904 |
| 1,390,867 | Barrett | Sept. 13, 1921 |
| 1,781,083 | Schmick | Nov. 11, 1930 |
| 2,578,784 | Dath | Dec. 18, 1951 |
| 2,651,212 | Mackmann | Sept. 8, 1953 |
| 2,666,335 | Clayborne | Jan. 19, 1954 |
| 2,672,766 | Dunkelberger | Mar. 23, 1954 |
| 2,732,726 | Hakanson | Jan. 31, 1956 |